United States Patent
Ghanem (10) Patent No.: US 8,933,642 B2
(45) Date of Patent: Jan. 13, 2015

(54) DIMMABLE LED LAMP

(75) Inventor: Mohamed Cherif Ghanem, Pierrefonds (CA)

(73) Assignee: General Electric Company, Schenectady, NY (US)

( * ) Notice: Subject to any disclaimer, the term of this patent is extended or adjusted under 35 U.S.C. 154(b) by 168 days.

(21) Appl. No.: 13/436,040

(22) Filed: Mar. 30, 2012

(65) Prior Publication Data

US 2012/0286696 A1    Nov. 15, 2012

Related U.S. Application Data

(60) Provisional application No. 61/485,829, filed on May 13, 2011.

(51) Int. Cl.
*H05B 37/02* (2006.01)
*H05B 33/08* (2006.01)

(52) U.S. Cl.
CPC .......... *H05B 33/0815* (2013.01); *Y02B 20/347* (2013.01); *Y02B 20/383* (2013.01)
USPC ............................ 315/291; 315/224; 315/276

(58) Field of Classification Search
CPC . H05B 37/02; H05B 33/0815; H05B 33/0851
USPC .................. 315/224, 247, 276, 291, 307, 310
See application file for complete search history.

(56) References Cited

U.S. PATENT DOCUMENTS

| | | | |
|---|---|---|---|
| 6,680,834 B2 | 1/2004 | Williams | |
| 7,262,559 B2 | 8/2007 | Tripathi et al. | |
| 7,535,183 B2 | 5/2009 | Gurr | |
| 7,615,974 B1 | 11/2009 | Xu | |
| 7,667,408 B2 | 2/2010 | Melanson et al. | |
| 7,757,881 B1 | 7/2010 | Riley | |
| 7,821,237 B2 | 10/2010 | Melanson | |
| 7,843,146 B2 | 11/2010 | Chang Chien et al. | |
| 8,558,470 B2 * | 10/2013 | Shteynberg et al. | 315/224 |
| 2007/0210725 A1 | 9/2007 | Marosek | |
| 2010/0109550 A1 | 5/2010 | Huda et al. | |
| 2010/0171429 A1 | 7/2010 | Garcia et al. | |
| 2010/0213859 A1* | 8/2010 | Shteynberg et al. | 315/224 |

(Continued)

FOREIGN PATENT DOCUMENTS

| | | |
|---|---|---|
| EP | 0660648 A1 | 6/1995 |
| EP | 1502483 B1 | 11/2003 |

(Continued)

OTHER PUBLICATIONS

Search Report and Written Opinion from corresponding PCT Application No. PCT/US2012/037468 dated Jul. 8, 2013.

(Continued)

*Primary Examiner* — Don Le
(74) *Attorney, Agent, or Firm* — GE Global Patent Operation; Peter T. DiMauro (57) ABSTRACT

A driver for an LED lamp assembly includes a rectifier configured to receive an AC power and produce a first DC power and a switching regulator coupled to the rectifier. The switching regulator is configured to receive the first DC power and produce an output DC power. The driver also includes a current controller coupled between the rectifier and the switching regulator. The current controller is configured to damp and stabilize an electric current flowing between the switching regulator and the rectifier.

17 Claims, 9 Drawing Sheets

(56) References Cited

U.S. PATENT DOCUMENTS

| | | |
|---|---|---|
| 2010/0219764 A1 | 9/2010 | Yamasaki et al. |
| 2010/0289395 A1 | 11/2010 | Sun et al. |
| 2010/0320840 A1 | 12/2010 | Fridberg |
| 2011/0002521 A1 | 1/2011 | Aburano et al. |
| 2011/0025217 A1 | 2/2011 | Zhan et al. |
| 2013/0293151 A1* | 11/2013 | Puvanakijjakorn et al. .. 315/297 |

FOREIGN PATENT DOCUMENTS

| | | | |
|---|---|---|---|
| EP | 1986470 | A2 | 10/2008 |
| EP | 2224789 | A1 | 9/2010 |
| EP | 2271181 | A1 | 1/2011 |
| WO | 2003096761 | A1 | 11/2003 |
| WO | 2011008635 | A1 | 1/2011 |

OTHER PUBLICATIONS

Sylvania, Osram, "High Quality Down Lighting Luminaire with 73% Overall System Efficiency", Specification, pp. 1-12, Jun. 30, 2008, XP002699675.

Marvell Semiconductor, "Marvell Response (LED DRiver PFC Section)", Report, pp. 1-11, Jun. 21, 2010, XP002399674.

* cited by examiner

DIMMABLE LED LAMP

BACKGROUND

1. Field of the Invention

The aspects of the present disclosure relate generally to LED light sources, and in particular to an LED light source compatible with different phase control dimmers.

2. Description of Related Art

Most dimmers used in lighting applications, such as home lighting, commercial lighting, and traffic signaling, are designed for use on locally available AC grid voltage. These dimmers operate with higher power consumption lamps that generally present as resistive loads to their controllers. Recent advancements in lamp technology have led to development of Light Emitting Diode (LED) lamps with improved efficiency and significantly lower power consumption. These LED lamps typically require DC power and often consume less than ten watts. Thus these lamps are not directly compatible with existing lighting fixtures and dimmers.

Nearly all lamp dimmers designed for use with a local AC power grid include a triac device to reduce lamp power. A triac is a bidirectional thyristor device for alternating current which may be viewed as a switch that can conduct current in either direction. When these dimmers are used to drive LED lamp assemblies, flickering can occur due to the switching and high current peaks resulting from triac switching current fluctuations caused by interaction with an EMI input filter. This flickering can have detrimental effects on the triac device. Further, a typical LED lamp is not compatible with all types of phase controlled dimmers. The lack of universal compatibility will prevent or drastically reduce the introduction of LED lamps into the marketplace as replacements or retrofits for standard incandescent lamps.

Increasing the power consumption of LED lamps is one approach that has been used to adapt LED lamps to various LED lamp dimmers. However, increasing the power consumption can create thermal issues in the LED lamp and the associated circuitry and offsets many of the benefits that drive the move to low power LED lamps. For example, the increased temperatures can reduce the usable life of the LED lamp, and increased power consumption reduces cost benefits.

Other approaches for adapting LED lamps to various dimmers have included the use of digital integrated circuit solutions that detect a firing angle of the dimmers or triacs. However, LED lamps do not always present as a resistive load leading to inaccurate detection of firing angle. Although the use of specific drivers, specific integrated circuits or more expensive digital integrated circuits may provide certain solutions, these solutions are typically directed to specific LED lamps and will work with only a few, specific dimmers. It would be advantageous to be able to utilize LED lamps in a wide range of existing and new applications and with existing and new dimmers without concern for compatibility issues. It would also be advantageous to maintain the power factor of a LED lamp circuit near unity, when a LED lamp is directly connected to the local mains supply without a dimmer.

Accordingly, it would be desirable to provide LED lamps that solve at least some of the problems identified above.

SUMMARY OF THE INVENTION

As described herein, the exemplary embodiments overcome one or more of the above or other disadvantages known in the art.

One aspect of the present disclosure relates to a driver for an LED lamp assembly. In one embodiment the driver includes a rectifier configured to receive an AC power and produce a first DC power and a switching regulator coupled to the rectifier. The switching regulator is configured to receive the first DC power and produce an output DC power. The driver also includes a current controller coupled between the rectifier and the switching regulator. The current controller is configured to damp and stabilize an electric current flowing between the switching regulator and the rectifier.

Another aspect of the present disclosure relates to a dimmable LED lamp assembly. In one embodiment, the assembly includes a rectifier configured to receive an AC power and produce a first DC power and a switching regulator coupled to the rectifier. The switching regulator is configured to receive the first DC power and produce an output DC power. The dimmable LED lamp assembly also includes an LED lamp coupled to the output DC power. The switching regulator includes an output transformer that has a primary side and a secondary side. The primary side is coupled to the first DC power, and the secondary side is coupled to the output DC power such that the first DC power is electrically isolated from the output DC power. The switching regulator also includes a power factor controller configured to maintain an electric current drawn from the first DC power substantially in phase with a voltage of the first DC power, and a power regulator that is configured to maintain the output DC power at a generally constant value based at least in part on a current flowing in the primary side.

Another aspect of the present disclosure relates to a method for controlling a dimmable LED lamp assembly. In one embodiment, the method includes receiving an AC power, using the AC power to enable a starting circuit, starting a unity power factor power supply with the starting circuit, and disabling the starting circuit once the power supply is started. The method continues by determining if a dimmer is connected to the lamp. In the case where a dimmer is connected to the lamp, a current controller is used to damp and stabilize a current drawn from the AC power, and the power supplied to the LED lamp is varied as a function of the voltage supplied by the dimmer. When a dimmer is not connected, the power factor of the lamp is regulated between about 0.99 and 1.0, the total harmonic distortion is maintained at less than about 20%, and the LED current is regulated at a predetermined value.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DETAILED DESCRIPTION OF THE DISCLOSED EMBODIMENTS

Figure 1:
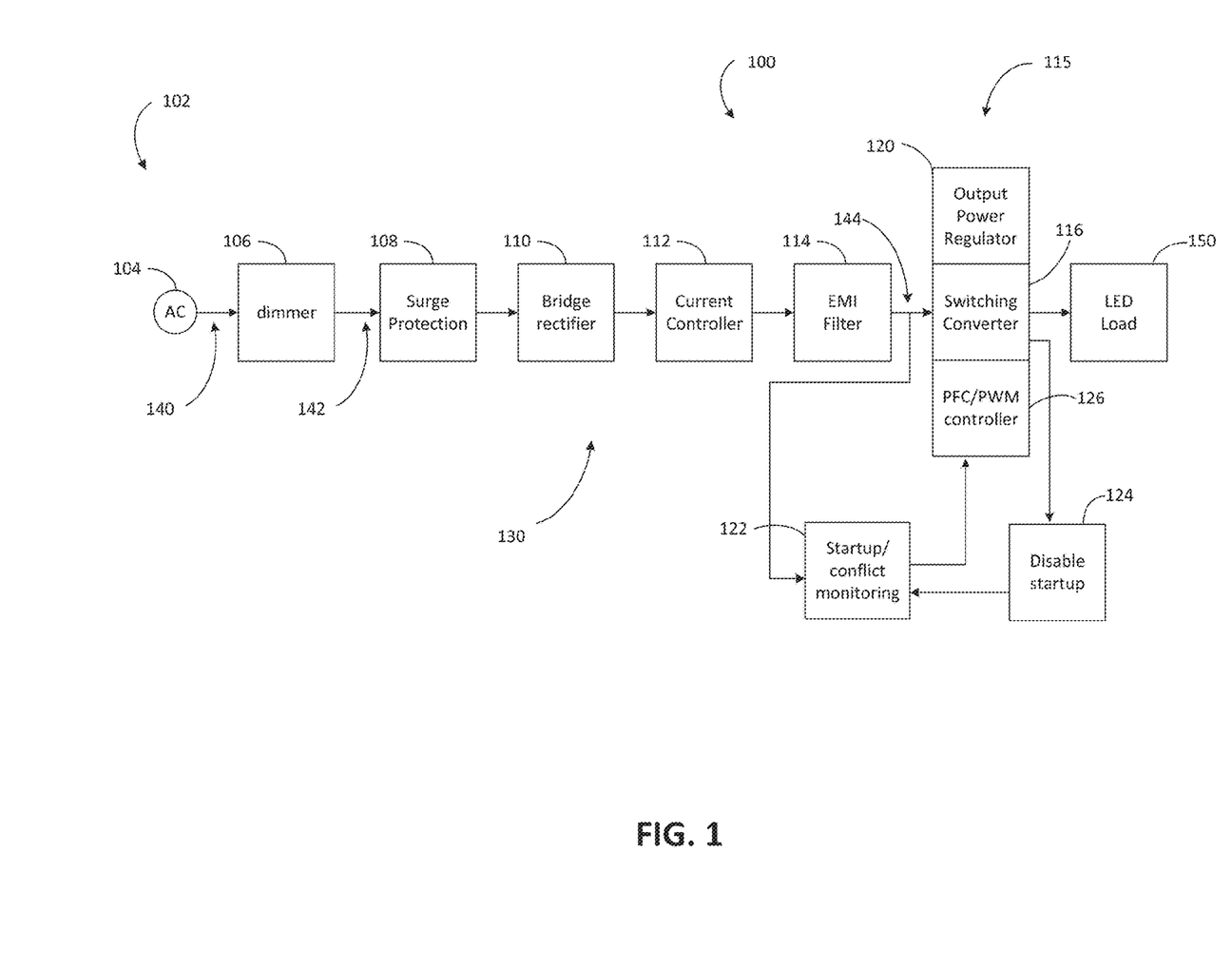
FIG. 1 shows a block diagram illustrating one embodiment of a dimmable LED light source incorporating aspects of the present disclosure.

Referring to FIG. 1, a block diagram of an exemplary dimmable LED light source incorporating aspects of the disclosed embodiments is generally designated by reference numeral 100. The aspects of the disclosed embodiments are directed to an LED light source that is compatible with different phase control dimmers 106. The LED light source of the disclosed embodiments can be used for general lighting applications and specialty applications; such as for example traffic signals and is compatible with many phase control dimmer devices as are commonly used in home lighting applications. The dimmable LED light source 100 shown in FIG. 1 is typically connected to a lamp controller 102 such as those used in traffic controllers and home lighting applications. Typical lamp controllers 102 include a dimmer 106 and receive power from an AC line 104. In certain embodiments the dimmer 106 may be incorporated within the dimmable LED light source 100 allowing the LED light source to be connected directly to the AC line 104. The LED light source 100 of the disclosed embodiments incorporates a unity power factor switching regulator 115 and input current controller module 112 to provide a unity power factor and low total harmonic distortion of the current waveform when it is coupled directly to an AC line input 104 without any dimmer devices 106. The dimmable LED 100 includes additional conflict monitoring circuitry 122 necessary for compatibility with North American and European traffic lamp application standards.

As shown in FIG. 1, the light source 100 includes a non-linear LED load 150. The non-linear load 150 will include at least one LED, but will more generally comprise one or more sets of LEDs. An LED set is typically formed of a plurality of subsets of LEDs, where the LEDs of each subset are interconnected. The interconnection can be serial, parallel or mixed connections. Subsets of serially interconnected LEDs are generally connected in parallel to form the set.

The light source 100 is supplied with power by an AC power source 104 which is typically a local power grid. The AC power source 104 can generally comprise any suitable AC power source with a root-mean-square (rms) voltage in the range of about 80 to about 260 volts and a frequency in the range of about 50 to about 70 Hertz. Suitable AC power sources include the 115 volt 60 Hz grid power available in North America, or the 220 volt 50 Hz grid power available in Europe. In applications where reduced brightness is desirable, a dimming device or dimmer 106 is included in the lamp controller 102, or alternatively a dimming device 106 is included as part of the dimmable LED light source 100. In either case, an AC power 142 is applied to the dimmable LED lamp 100.

The dimmable LED 100 receives applied lamp power 142 into a surge protector 108. The surge protector 108 has negligible effect when the input power is within safe operating limits and is configured to block voltage spikes that have the potential to harm electronics in the dimmable LED 100. These unsafe power surges can be cause by intermittent events such as lightning.

A full wave bridge rectifier 110 converts the AC input power 142 to direct current (DC) in the form of a full-wave rectified sine wave. This produces a DC voltage that is conditioned and regulated by the LED driver circuitry generally indicated by numeral 130. In the exemplary embodiment shown in FIG. 1, the LED driver circuitry 130 comprises components 108 through 126, each of which will be described in more detail below. The LED driver circuitry 130 also includes an isolated switching DC-DC regulator 115 that converts the rectified sine wave power signal from the rectifier 110 to the filtered DC power required by the LED load 150. The DC-DC switching regulator 115 includes a switching converter 116, an output power regulator 120, and a power factor correction (PFC) and pulse width modulation (PWM) controller 126. In one embodiment, the switching converter 116 comprises a flyback regulator and power factor control (PFC) to produce a device with a power factor close to unity. Those skilled in the art will recognize that any type of switching converter, such as for example a buck regulator or boost regulator etc, and PFC may be used without straying from the spirit and scope of the disclosed embodiments.

The DC power from the bridge rectifier 110 is fed through a current control circuit 112 to remove current spikes and oscillations that may cause compatibility problems with dimmer 106, such as the phase control dimmers typically used in general illumination. The current control circuit 112 will be described in more detail below.

In some embodiments an EMI filter 114 is coupled between the bridge rectifier 110 and the switching regulator 115 to remove noise and other high frequency components that may result in electromagnetic emissions that can interfere with other nearby electronic devices. These high frequency components and noise are created by the switching converter 116 and are propagated through the sinusoidal DC power signal 144. This electromagnetic interference (EMI) filter 114 is also sometimes referred to as an electromagnetic compatibility (EMC) filter. The EMI filter 114 typically comprises an arrangement of capacitors, inductors, and/or differential and common mode chokes, to reduce conducted and radiated electromagnetic emissions and comply with telecommunications standards. The current flowing through the EMI filter 114 is generally proportional to the full wave rectified voltage at the output of the bridge rectifier 110, is sinusoidal in nature and is maintained in phase with the voltage waveform by the switching regulator 115 to keep the power factor of the dimmable LED lamp 100 at or close to unity.

The DC-DC switching regulator 115 receives rectified sinusoidal DC power 144 from the EMI filter 114 and provides power to the LED load 150. An output transformer (not shown) is coupled within the switching converter 116 to electrically isolate the input power from the output power. The power provided to the LED load 150 is monitored by an output power regulation circuit or regulator 120 to ensure substantially constant output power and to vary the output power according to changes in voltage of the input power 142. The output power regulator 120 works in conjunction with the PFC/PWM controller 126 to ensure that the power drawn by the LED load 150 is limited to an acceptable operating region and remains in phase with the input voltage 142. The controller 126 also includes an overvoltage protection circuit that is generally configured to detect and limit the voltage applied to the LED load 150 to protect it and prevent damage from voltages that may exceed its rated limits. The PFC/PWM controller 126 provides pulse width modulation and power factor control (PFC) and is generally configured to create a sinusoidally shaped input current waveform that is in phase with the input voltage, thus maintaining a power factor at or close to unity.

During normal operation the switching regulator 115 provides power to the LED load 150 and also provides an internal low level DC common collector voltage, referred to herein as VCC, to power controllers, logic circuits, and low level electronics contained in the switching regulator 115. This low level voltage, VCC, is provided by the switching converter 116, however at initial startup, the switching converter 116 is not operating and thus cannot provide VCC to operate the controller 126 or start the converter 116. A startup/conflict monitoring circuit 122 is included to provide VCC while the switching converter 116 is starting. The startup circuit 122 is generally in the form of a small linear power supply that receives power directly from the EMI filter 114 and thus can provide VCC to the PFC/PWM controller 126 and output power regulator 120 before the switching converter 116 is started. Once the switching converter 116 is running, it can take over generation of VCC for the controller 126 and regulator 120, and the startup circuit 122 is no longer needed. A disable startup circuit 124 detects when the switching converter 116 is running and able to provide the necessary VCC, at which point the disable circuit 124 signals the startup/conflict monitoring circuit 122 and the startup circuit 122 shuts down.

The start-up circuit 122 can also act as a conflict monitor as defined by the Institute of Transportation Engineers (ITE) and the North American controller standard for traffic lamp applications. The start-up circuit 122 when configured to operate as a conflict monitor, will adapt the light source 100 to work in and be compatible with any type of North American traffic lamp controller.

In one embodiment, the dimmer 106 is a phase controlled dimmer and the current controller 112 is configured as an electronic repetitive input peak current limiter and damper circuit and acts to limit repetitive inrush currents and current spikes as well as damping oscillations caused by firing of the triac contained within the phase control dimmer 106 that may be driving the LED light source 100. The current controller circuit 112 will stabilize the triac and present a more resistive type load to circuits external to the dimmable LED 100. Nearly all dimmer circuits used in general illumination and other lamp control circuits 102 include a triac device. The phase control dimmer 106 reduces power to the load, which is the dimmable LED 100 in the embodiment shown in FIG. 1, by beginning to conduct at some point during each half cycle of the AC line voltage 104, and remaining on, i.e. conducting, until the AC current reaches, or crosses zero. The dimmer 106 turns on by firing the triac at a certain voltage. This voltage is also referred to as a firing angle. The triac will then, by virtue of its construction, turn off when the current flowing through it reaches zero. By delaying firing the triac until a later point in each half cycle, the rms voltage delivered to the load is reduced.

Typical EMI Filters create current spikes and oscillations at their inputs when connected to phase controlled dimmers such as dimmer 106. These spikes and oscillations can interfere with operation of the dimmer and prevent dimmed operation. Typical LED lamp drivers can also cause a phase shift between the voltage and current flowing through the triac. If the phase difference becomes too great, the voltage may be above the triac firing voltage when the current reaches zero causing the triac to re-fire immediately thereby interfering with dimming of the lamp.

Although not shown in FIG. 1, the dimmable LED 100 can include other circuits and components, including, but not limited to, an electronic safeguarding circuit, an input under/over voltage circuit, and an input reference current sensor. In alternate embodiments it may be advantageous to include a dimming option or dimmer circuit, and/or a light output detection circuit within the dimmable LED 100 electronics.

During dimmed operation, firing of the triac in the dimmer circuit 106 causes large spikes and oscillations in current flowing to the LED driver circuitry 130. The current control circuit 112 is configured to monitor these current fluctuations and add attenuation and damping when the current exceeds a predetermined operating range. The current controller 112 uses a variable impedance to control the current. Under normal conditions, i.e. when the current is within a desired operating range, the current controller 112 remains in saturation and the variable impedance is nearly zero. Thus while the current controller is saturated it has negligible effect on the input current. However, when the current exceeds a predetermined range, such as when the triac fires producing a current spike, the current controller comes out of saturation and begins operating in a linear mode where the variable impedance is increased proportionally to limit and damp the current. The large change in voltage versus time (dv/dt) created each time the triac in the dimmer 106 is fired, causes a high current through the input filter capacitor of the EMI filter 114. This high current will cause the current controller circuit 112 to enter its linear mode. While in linear mode, the variable impedance of the current controller 112 is proportional to the magnitude of the excess current, thereby restricting the current flow to desired levels and providing damping to eliminate oscillations.

Figure 2:
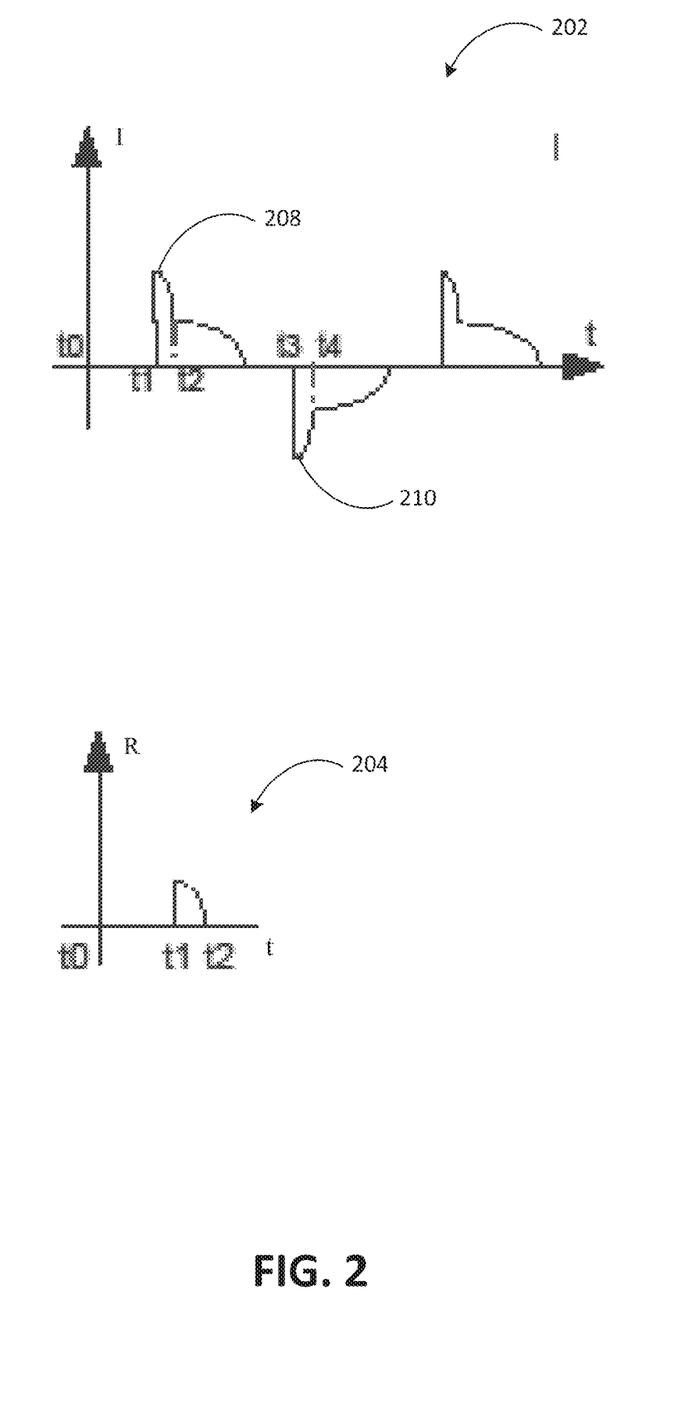
FIG. 2 shows graphs illustrating current and resistance profiles of a dimmable LED lamp driver incorporating aspects of the present disclosure.

Referring now also to FIG. 2 a graph 202 is shown depicting the waveform of current drawn by the dimmable LED light source 100 during dimmed operation. In the graph 202, current, I, is represented on the vertical axis and time, t, is represented on the horizontal axis. The triac in the dimmer 106 is fired at time t1 in the positive half cycle resulting in a current spike 208 generated by interaction of the dimmer 106 and charging of energy storage components in the EMI filter 114. The input current controller 112 monitors current flowing from the dimmable LED 100 in a manner that limits any peak currents, such as the spike 208, and damps any oscillations that may occur between the EMI filter 114 and the input voltage 104. Without the current controller circuit 112, there would be nothing to limit the current in which case the spikes 208 shown in graph 202 can often be an order of magnitude greater and can contain high frequency oscillations produced as the rapid changes in current and voltage interact with reactive components in other circuits, such as the capacitors and inductors in the EMI filter 114. Large current spikes and oscillations can interfere with operation of the dimmer 106 resulting in loss of functionality. At time t2 the spike 208 subsides allowing the current controller 112 to enter saturation and the current begins tracking the sinusoidal shape of the AC line voltage 104. The current continues to track the AC line voltage until the end of the half cycle when the current reaches zero and the triac resets. At time t3 the AC line voltage reaches the negative triac firing voltage and the triac fires again resulting in another spike 210 lasting until time t4. After the spike 210 subsides at time t4 the current again tracks the sinusoid of the AC line voltage until the AC line voltage reaches zero at which time the triac resets again. During periods of excessive current, such as the interval t1 to t2, the current controller operates in its linear mode where the variable impedance is increased proportionally with the excess current. In certain embodiments the variable impedance may be created using a field effect transistor (FET) as will be described in more detail below, in which case the variable impedance is resistive in nature. Thus when the FET enters its linear mode an effective resistance is introduced to restrict the flow of current. This effective resistance is illustrated by graph 204 which shows effective resistance on the vertical axis and time t on the vertical axis. At time t1 the triac fires causing a large current spike. One embodiment of the current control circuit 112 reacts to this by increasing its effective resistance 204. When the spike ends at time t2, the current returns to the desired range and the effective resistance 204 returns to nearly zero. This process repeats each time a current spike occurs resulting in the current profile shown in the graph 202 where the current waveform closely tracks the input voltage waveform and the switching spikes 208 and 210 are limited by the current control circuit 112. The current controller 112 provides damping and stabilization of current flowing through it in order to diminish spikes and damp oscillations to ensure a generally sinusoidal current waveform that is compatible with most phase control dimmers.

Figure 3:
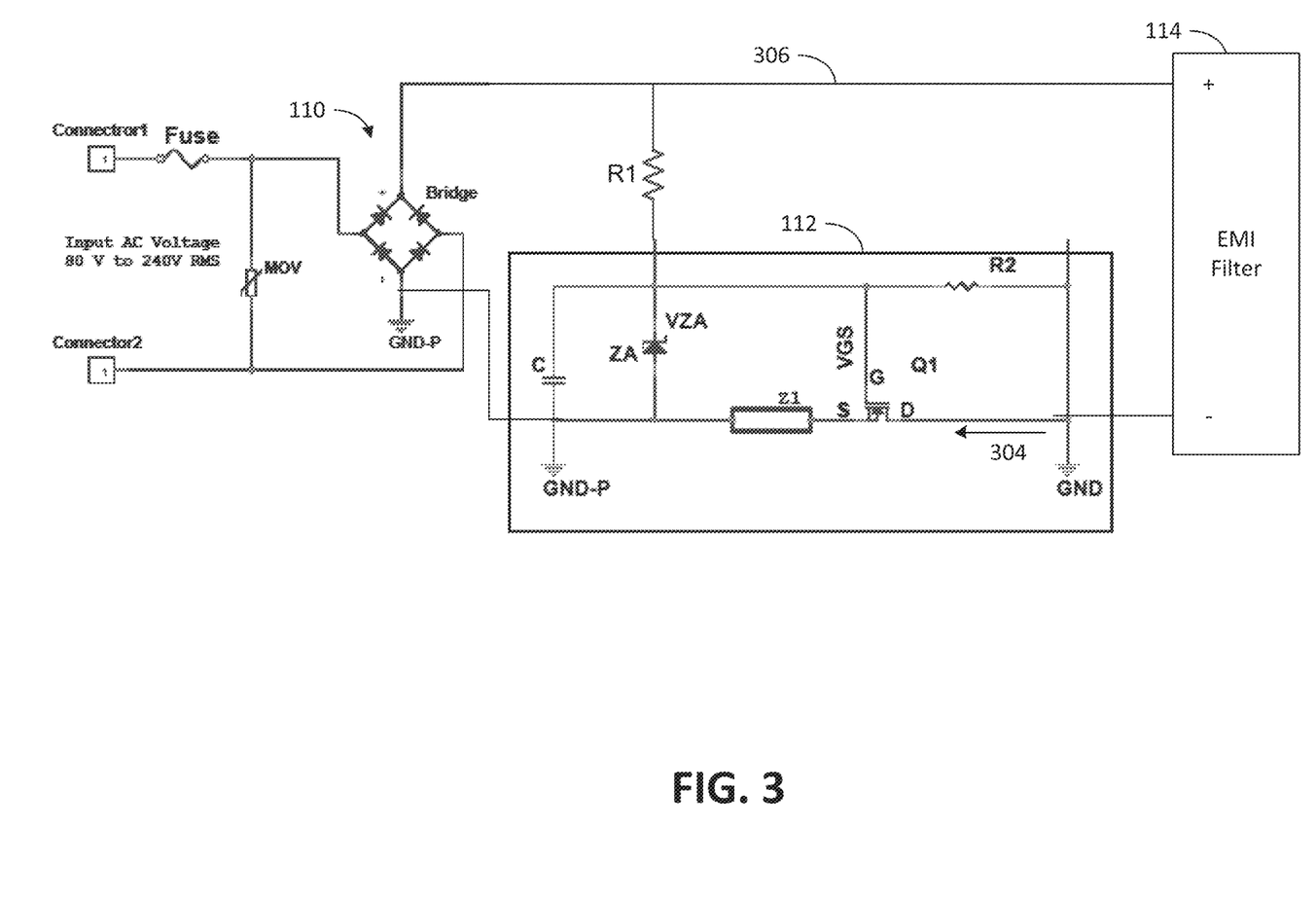
FIG. 3 shows a schematic diagram illustrating an embodiment of a current controller circuit incorporating aspects of the present disclosure.

FIG. 3 shows a schematic diagram illustrating one embodiment of a current controller 112, also referred to as an electronic input peak current limiter and damping circuit. In this embodiment, the current control circuit 112 includes three primary components. A metal-oxide-semiconductor field effect transistor (MOSFET) Q1, a zener diode ZA and an impedance Z1. The impedance Z1 can be a resistive load, or alternatively it can be a reactive load comprised of capacitors, inductors, and resistors. The current control circuit 112 shown in FIG. 3 is coupled in the current return path and operates by directly controlling the current flowing in the return path, which also indirectly controls current flowing in the forward path. The return path is the negative side of the circuit, i.e. the current flowing from the circuit ground, GND, or negative side of the EMI filter 114 and regulator 115, to the primary ground, GND-P, at the negative or return side of the bridge rectifier 110. Alternatively, the current controller 112 may be placed in the forward path 306 to directly control current flowing from the positive side of the bridge rectifier 110 to the positive side of the EMI filter 114, and indirectly control current in the return path. The return path load current 304 flows from the EMI filter 114 through the transistor Q1 and through the impedance Z1 back to the return side, GND-P, of the bridge rectifier 110. When the load current is low the voltage drop across the impedance Z1 is small and the gate to source voltage applied to transistor Q1 is substantially equal to the voltage $V_{ZA}$ of zener diode ZA. Power for the zener diode ZA is supplied by a resistor divider R1, R2 coupled to the DC output of the rectifier bridge 110. $V_{ZA}$ is selected such that the transistor Q1 is maintained in saturation while the load current 304 is below a desired limit so that the current control circuit 112 has little effect while the load current 304 is within its desired operating range. When the load current 304 exceeds the desired range, the voltage across the impedance Z1 becomes significant and the gate to source voltage VGS is controlled by the equation $V_{GS}=V_{ZA}-V_{Z1}$, where $V_{Z1}$ is the voltage across the impedance Z1. By ohms law $V_{Z1}$ is known to be equal to the impedance value times the current flowing through it yielding a gate to source voltage of $V_{GS}=V_{ZA}-(Z1 \times I)$. When the triac device in dimmer 106 fires, the current 304 is very high for a small amount of time, generally on the order of a microsecond. As the current increases, the gate to source voltage of Q1, $V_{GS}$, decreases, and the transistor Q1 falls into its linear operating region where the effective impedance between the gate G and source S of the transistor Q1 increases proportionately with the current, thereby limiting the amount of load current flowing and damping any oscillations that may occur. When the triac firing cycle is complete, the input current 304 returns to a normal or nominal value, causing the transistor Q1 to return to saturation where its effective impedance is near zero and the current follows the sinusoidal waveform of the AC input line for the remaining portion of the input voltage half cycle (each half cycle is about 8 ms in North America where the power grid operates at 60 Hertz and about 10 ms for Europe). As shown above, the gate-to-source voltage $V_{GS}$ is a function of the load current 304. As load current increases $V_{GS}$ falls into the linear region of transistor Q1 resulting in increased resistance to limit the load current. The increased resistance also acts to damp any oscillations that may occur.

Figure 4:
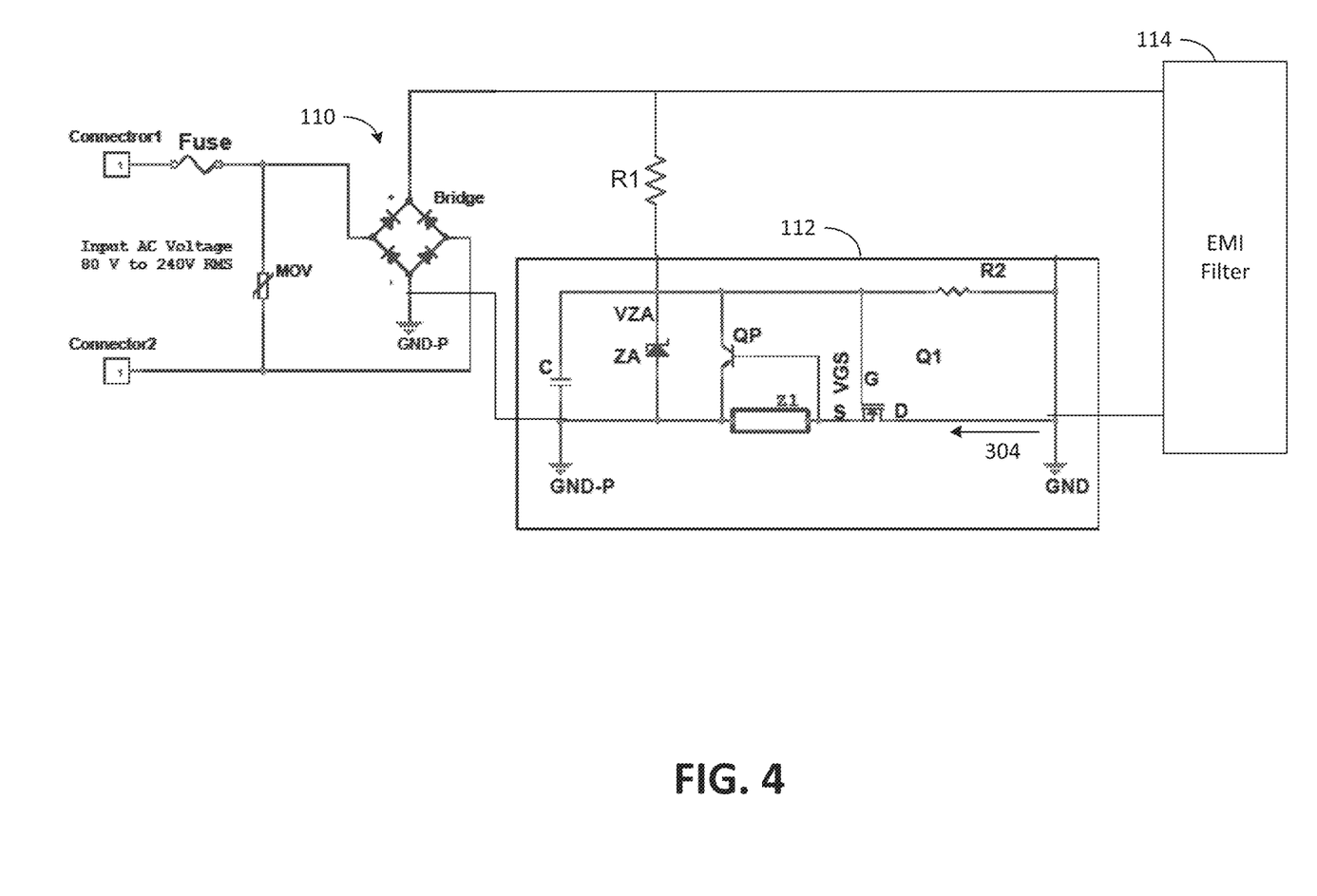
FIG. 4 shows a schematic diagram illustrating an alternate embodiment of a current controller circuit for higher current applications incorporating aspects of the present disclosure.

The current control circuit shown in FIG. 3 is appropriate for low current applications. However, when larger load currents are required, it is desirable to use an additional transistor to drive the current limiting transistor Q1. An alternate embodiment of the current control circuit 112 is shown in FIG. 4. In this embodiment a bipolar junction transistor QP is coupled to the impedance Z1 and to the gate of the current limiting transistor Q1. The transistor QP acts to amplify the current sensing signal generated by impedance Z1 allowing a smaller voltage $V_{Z1}$ to drive the current limiting transistor Q1 resulting in a more efficient device.

Figure 5:
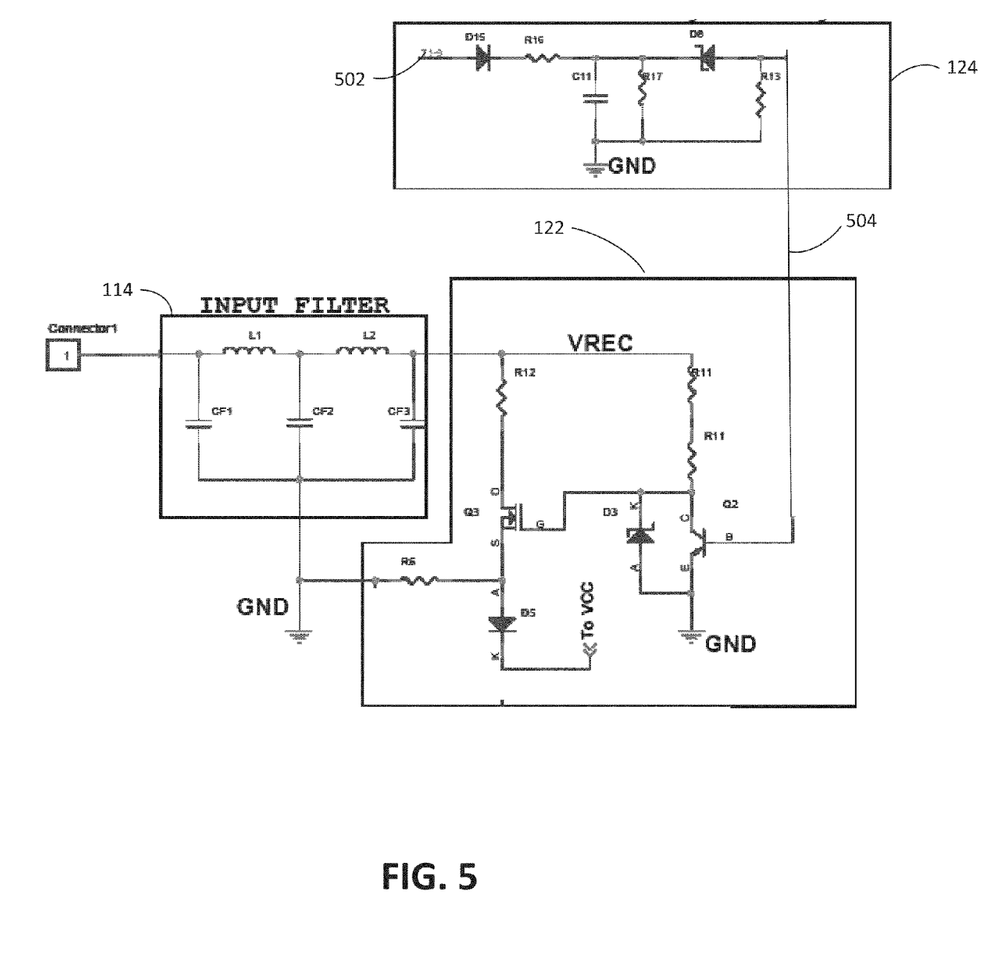
FIG. 5 shows a schematic diagram illustrating an embodiment of a startup circuit, EMI filter, and disabling circuit incorporating aspects of the present disclosure.

FIG. 5 shows a schematic diagram illustrating one embodiment of an EMI Filter 114 and startup circuit 122 as may be used in the dimmable lamp 100. In this embodiment the EMI filter 114 is a double-stage filter comprising three capacitors CF1, CF2, CF3, and two inductors L1, L2 arranged to provide a large attenuation of higher frequencies. The attenuation provided is sufficient to satisfy EMI requirements for Class B devices, such as Federal Communications Commission (FCC) and CISPR15. The starting circuit 122 shown in the embodiment of FIG. 5 comprises a small linear power supply configured to generate a voltage VCC from the filtered input power. The startup circuit 122 provides operating power, VCC, for the controller 126 and other low level circuits until the converter 116 power reaches an adequate level. The disable startup circuit 124 monitors the power provided by the switching converter 116 through a sensing signal 502. Once the output of the converter 116 reaches a level determined by zener diode D8 and the combination of resistors R13, R16, and R17, a disabling signal 504 is applied to the startup circuit 122 at the base of transistor Q2 thereby shutting off Q3 and ending production of VCC within the startup circuit 122.

Figure 6:
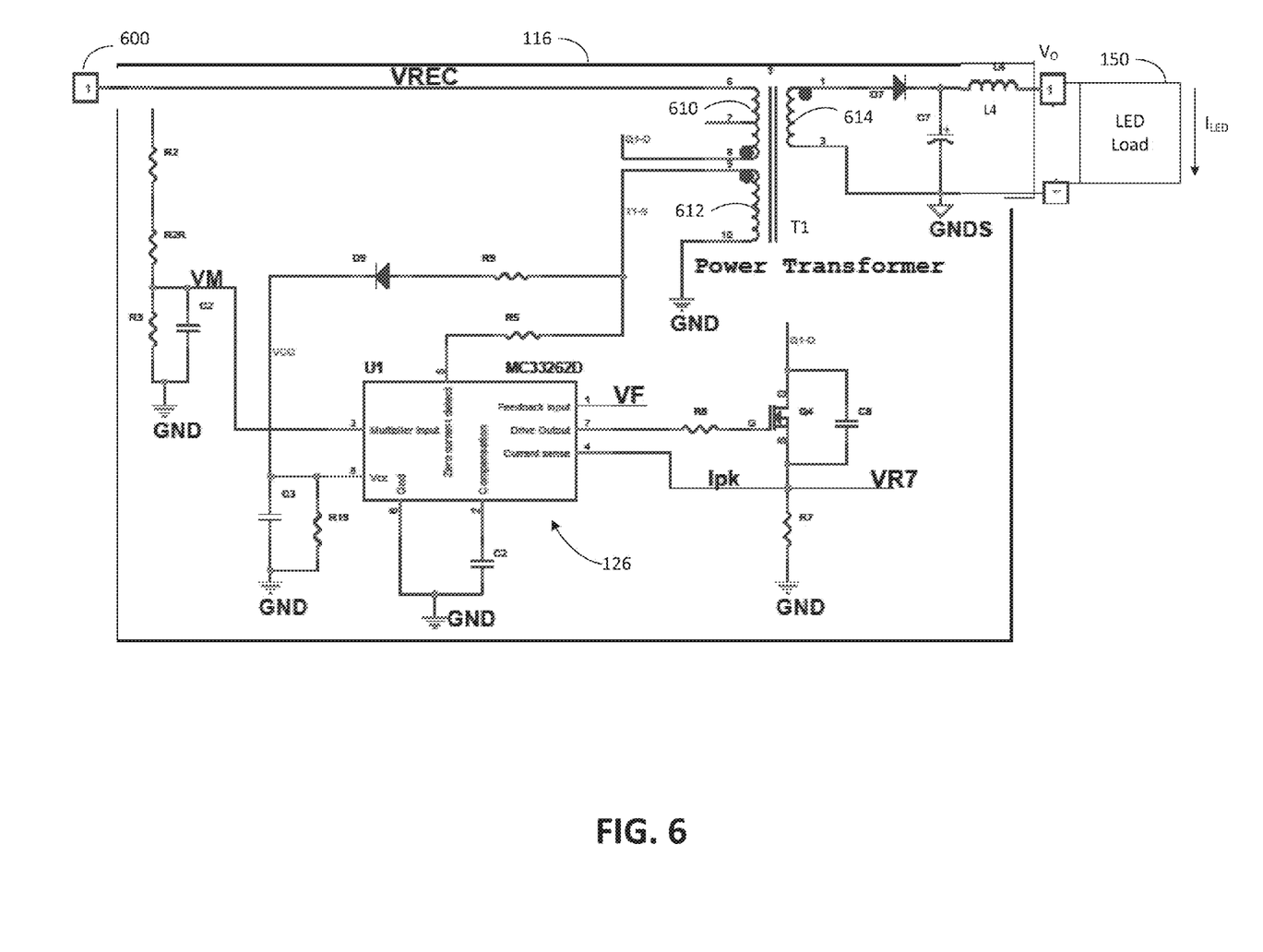
FIG. 6 shows a schematic diagram illustrating an embodiment of a switching regulator incorporating aspects of the present disclosure.

FIG. 6 shows a schematic diagram of an exemplary DC-DC switching converter 116 as may be used in the dimmable lamp 100 shown in FIG. 1. In this embodiment, the switching converter 116 comprises a flyback converter configuration as is known in the art and includes an integrated PWM/PFC controller U1, such as for example an industry standard power factor controller MC33262D available from MOTOROLA as well as other manufacturers. The converter 116 receives a rectified sinusoidal DC input voltage 600 and supplies an output voltage $V_O$ and current $I_{LED}$ to the LED load 150. The power delivered to the load 150 is controlled by operating a switching device Q4, which in the illustrated embodiment is a MOSFET, in a pulse width modulated (PWM) fashion based on the multiplier voltage VM and a feedback voltage VF. The controller 126 senses the input voltage 600 through a resistor network R2, R2R, and R3, which includes a capacitor C2 to provide some filtering, and uses this voltage as its multiplier input voltage VM. The controller 126 also monitors the instantaneous input current, Ipk, with a current sensing resistor R7 and uses this value, Ipk, along with the multiplier voltage VM to facilitate power factor control. The controller 126 ensures that the current drawn by the converter 116 remains in phase with the input voltage 600 thereby making the converter 116 appear as a purely resistive load. An output transformer T1 is included in the converter 116 to provide, among other benefits, isolation between the input power 600 and the output $V_O$. The primary side of the transformer T1 is coupled to the input power 600 and includes a primary winding 610 across terminals 6 and 8 and a low power winding 612 across terminals 9 and 10. The low power winding 612 is used to supply power to the controller 126 and supporting circuitry. The secondary side of the output transformer T1 includes a secondary winding 614 across terminals 1 and 3 of the transformer T1. The secondary winding 614 drives a rectifier and output filter comprising diode D7, capacitor C7, and inductor L4, to provide the generally constant DC output voltage $V_O$ and current $I_{LED}$ to the LED load 150.

In typical switching converters known in the art, the controller senses the output voltage and uses feedback control to regulate the converter such that a constant output voltage is maintained. Similarly, it is also known to regulate the output current by using current sensors coupled to the load current $I_{LED}$. However, using either of these approaches in a dimmable LED lamp 100 presents problems. For safety consideration and regulatory requirements it is desirable to electrically isolate the low level output power form the higher level input power of the converter 116. Thus the output sensing circuits become more complicated due to inclusion of electrical isolation elements. By regulating the output at a constant level, i.e. constant output voltage or constant output current, the controller 126 operates to compensate for changes in the input voltage in order to keep the output steady. However, this type of output regulation negates the ability of a dimmer to reduce lamp brightness by reducing input voltage.

The controller 126 of the disclosed embodiments employs a power sensing circuit to monitor the power at the primary side of the output transformer T1 and use this as the feedback voltage VF in a regulation loop of the controller 126. The current delivered to the load is proportional to the current in the primary side of the output transformer T1 as is shown below. The DC current, $I_{LED}$, and DC voltage $V_O$, delivered to the LED load are related to the current and voltage on the primary side of the output transformer T1 by the equations:

$$I_{LED} = I_O \cdot 2NK \frac{H_2}{H_1}; \text{ and} \quad \text{(Eq. 1)}$$

$$V_O = \frac{V_B}{N}; \quad \text{(Eq. 2)}$$

where $I_O$ is the average current in the primary winding of the output transformer T1 (the primary winding is across terminals 6 & 8) which is proportional the average voltage on the current sensing resistor R7 (which is proportional to Ipk), and $V_B$ is the output voltage $V_O$ reflected to the primary side of the output transformer T1. The value K is proportional to the primary voltage $V_B$:

$$K = \frac{V_{ac\_nom}\sqrt{2} - 2V_{fb}}{V_B}; \quad \text{(Eq. 3)}$$

where $V_{ac\_nom}$ is the nominal rms line voltage such as 120 volts in North America or 230 volts in Europe, and the values $H_1$, and $H_2$ are also related to the primary voltage as follows:

$$H_1 = \frac{1}{\pi}\int_0^\pi \frac{\sin(\theta)}{1+K\sin(\theta)}d\theta; \quad \text{(Eq. 4)}$$

$$H_2 = \frac{1}{\pi}\int_0^\pi \frac{\sin(\theta)^2}{1+K\sin(\theta)}d\theta. \quad \text{(Eq. 5)}$$

The above analysis shows that a feedback loop can be created in the controller 126 that will regulate the output power at a substantially constant value, which results in a steady light output from the LED load 150, while sensing values from only the primary side of output transformer T1.

Figure 7:
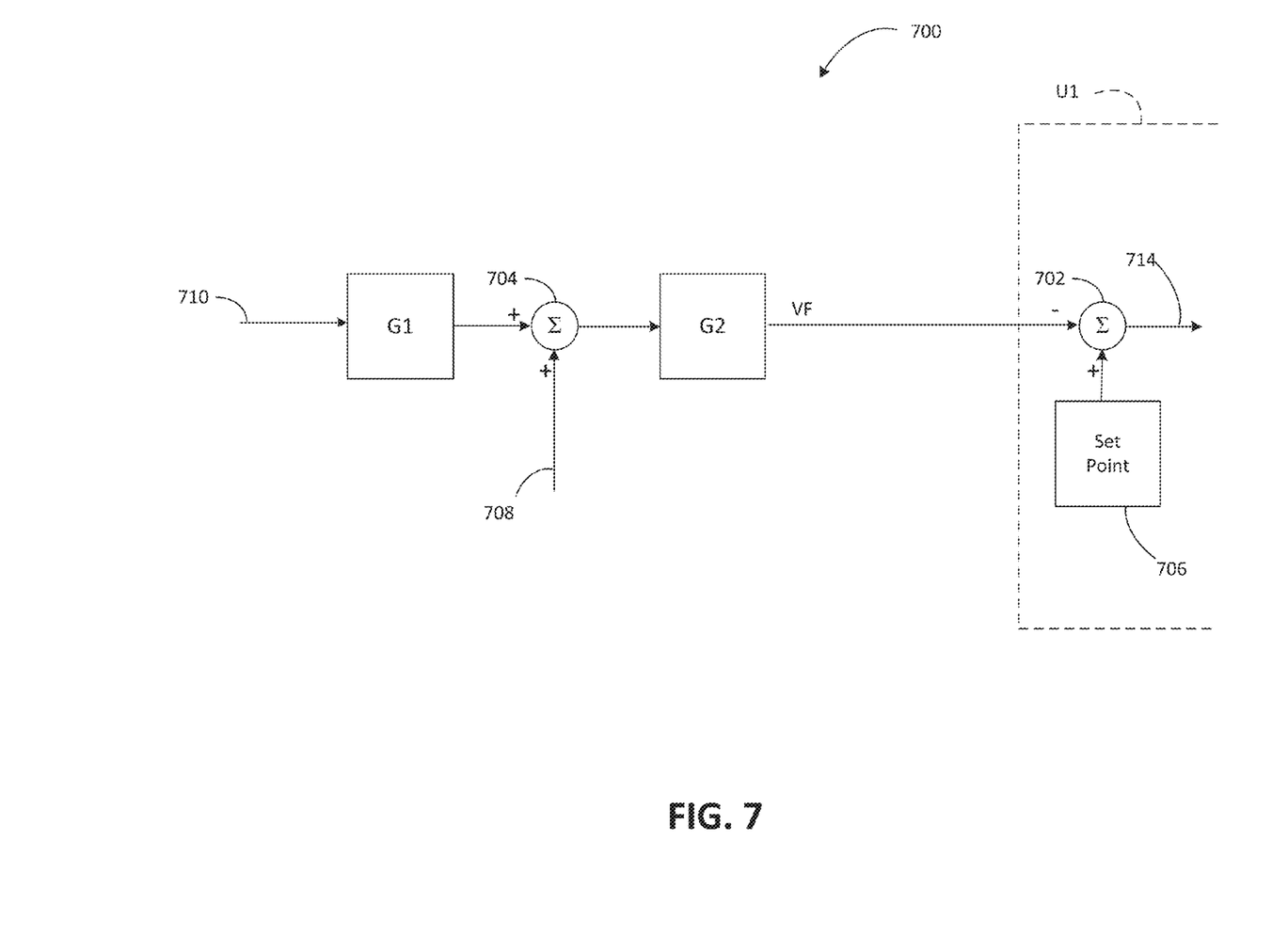
FIG. 7 shows a block diagram illustrating one embodiment of a feedback control circuit incorporating aspects of the present disclosure.

In order to avoid negating dimming functionality it is also necessary to adjust the regulated value in accordance with the input voltage applied by the dimmer 106. By sensing the voltage on the primary side of output transformer T1, the output power can be reduced in accordance with the applied voltage 600. FIG. 7 shows a block diagram of a feedback function 700 that can both regulate output power at a generally constant value and effect sympathetic variations in output power as input voltage is varied. The feedback function 700 receives a signal 710, also denoted as Ipk, that is proportional to the instantaneous peak of the primary current, which may be obtained from Ipk in FIG. 6, and receives a second signal 708 that is proportional to the instantaneous peak of the input voltage, VM. Note that the final summation 702 and set-point 706 are implemented inside processing device or controller U1 of controller 126 of FIG. 6. The portions of FIG. 7 implemented in U1 are denoted by the dotted line 714. From Eq. 1 above, the load current $I_{LED}$ is directly proportional to the primary side current $I_O$ which is proportional to signal 710. Thus the output current can be regulated by generating a feedback voltage VF=G1·IPK, where G1 is a feedback gain selected to appropriately stabilize the feedback loop. Using a feedback voltage VF that is proportional to only the load current $I_{LED}$ would cause the controller U1 to increase the output current linearly with the input voltage applied to the converter VREC which as was described above is being varied by the dimmer 106 to control the brightness of the lamp 150. The summer 704 adds the signal 708 to the feedback voltage VF that is proportional to the applied voltage VREC and causes the controller U1 to maintain the output power constant only when the applied voltage VREC is above a nominal input RMS voltage. Combining these two components yields the desired feedback VF:

$$VF=(IPK\cdot G1+VM\_Peak)G2 \quad \text{(Eq.6);}$$

where G1 and G2 represent gains in a feedback circuit. Using the above feedback voltage, VF (Eq. 6), causes the output power to vary linearly with the input AC RMS voltage 104, which is proportional to VM_Peak, while the input voltage 104 is between zero and a nominal value, such as 120 volts RMS as is often used in North America. When the input voltage 104 is above a nominal value, such as for example above 120 volts RMS, the output power is regulated at a substantially constant value. The feedback voltage VF is then compared at 702 to a set point 706 within the controller U1 to generate a control signal to drive PWM logic (also implemented inside controller U1 but not shown). When the dimmable LED lamp 100 is not connected to a dimmer 106 the applied voltage VREC will not be reduced and no dimming is required. In this case the controller U1 will operate in closed-loop mode, which means controller U1 will regulate the output power at a substantially constant value and will keep the current in phase with the voltage to maintain the power factor at or near unity.

Figure 8:
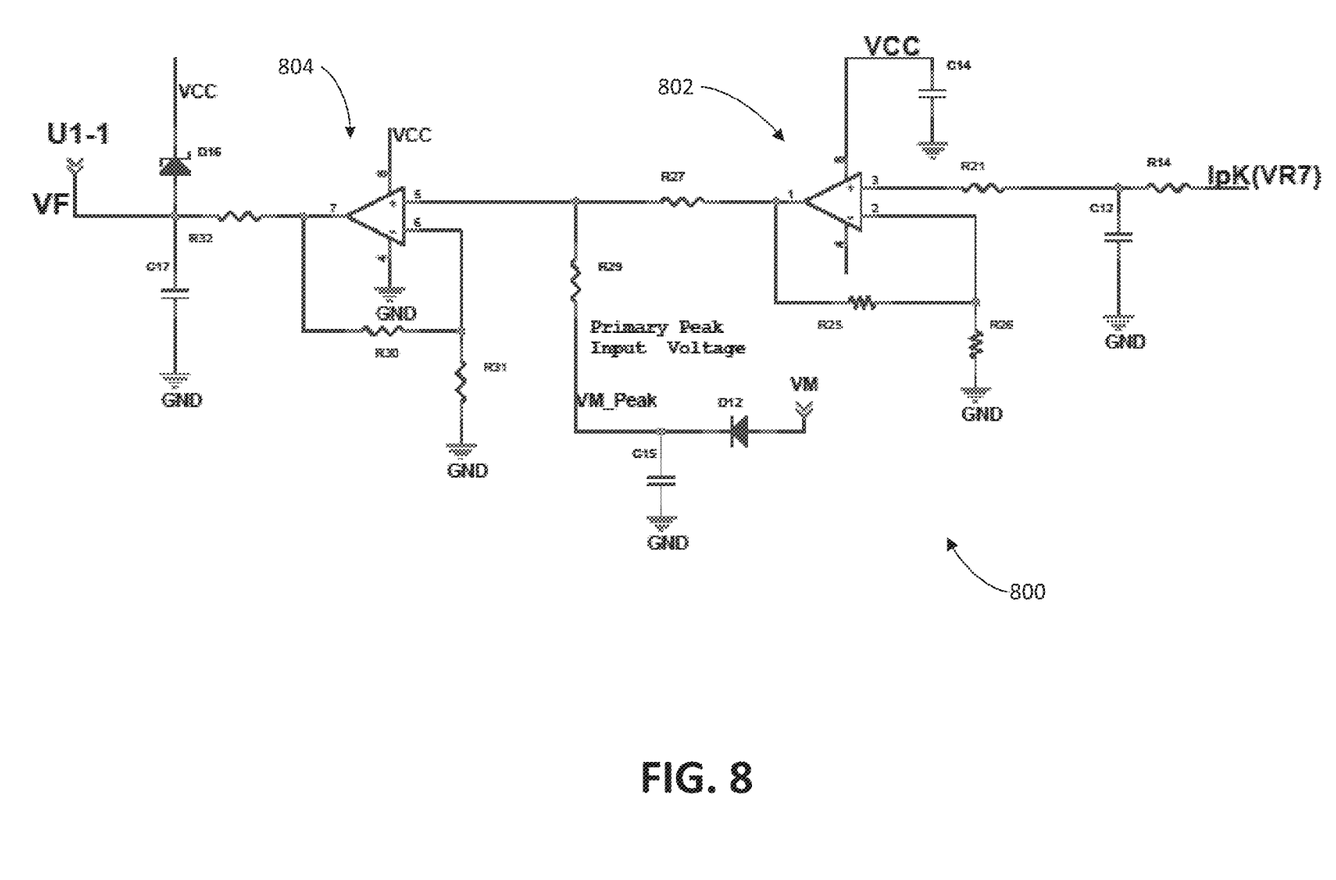
FIG. 8 shows a schematic diagram illustrating one embodiment of a feedback circuit incorporating aspects of the present disclosure.

FIG. 8 shows a schematic diagram illustrating one embodiment of a feedback circuit, generally indicated by numeral 800, as may be used to provide the feedback voltage VF as shown by Eq. 6 for the controller U1. The instantaneous primary current Ipk is averaged by filter network R14-C12 then the operational amplifier (op-amp) circuit 802 multiplies Ipk by a gain G1. The multiplier voltage VM, which is proportional to the instantaneous input (i.e. primary) voltage, is peak detected by D12 and capacitor C15 then summed with the output of op-amp circuit 802 and the resulting sum is multiplied by gain G2 by the op-amp circuit 804 resulting in the feedback voltage VF. The feedback circuit 800 operates in open loop mode, where it acts only as a power factor correction controller to ensure that the current drawn by the converter 116 remains in phase with the applied voltage VREC, while the applied input voltage VREC is below a predetermined maximum value. Once this maximum value is reached the feedback circuit 800 and the controller U1 enter a closed loop mode where they regulate the output power as well as continuing to control the power factor.

Figure 9:
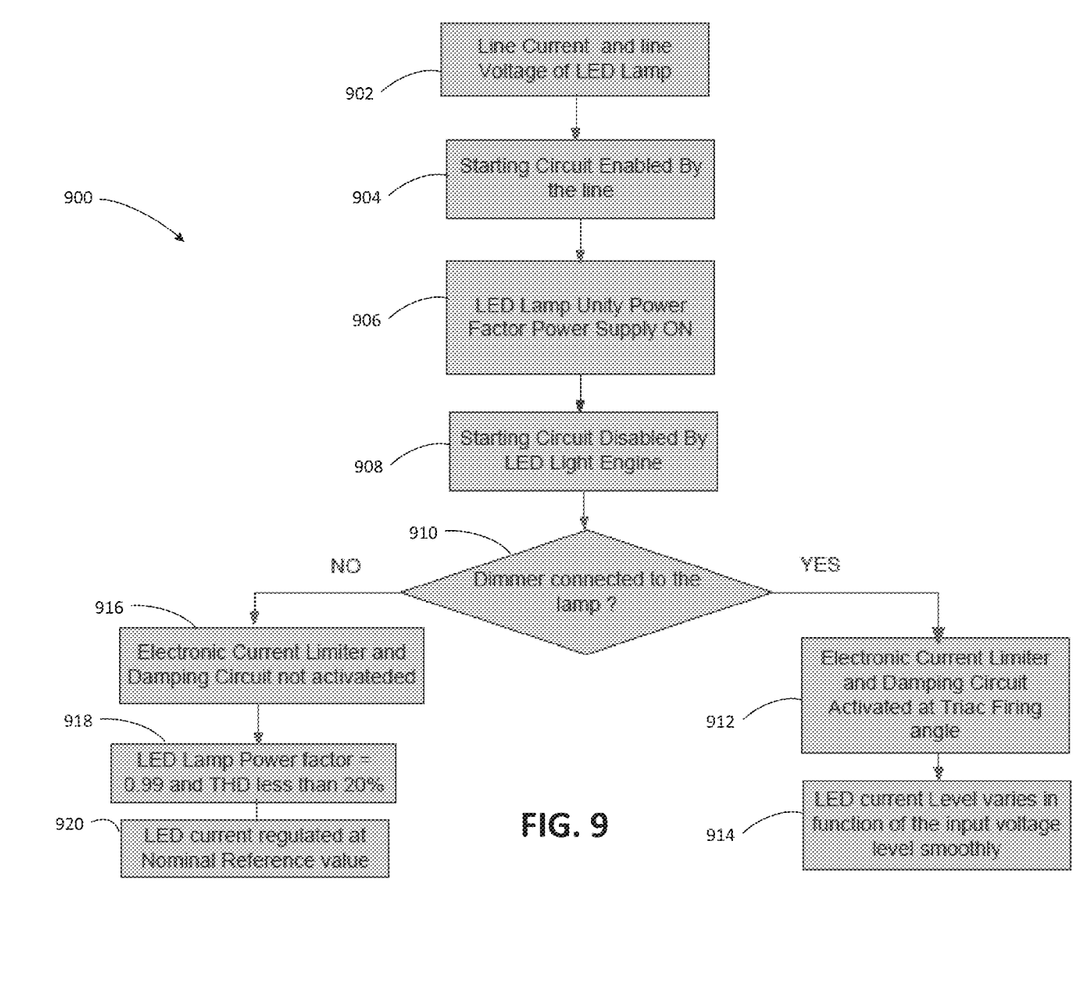
FIG. 9 shows a flow diagram illustrating a method of controlling an LED lamp incorporating aspects of the present disclosure.

FIG. 9 shows a flow diagram 900 illustrating one embodiment of a process incorporating aspects of the present disclosure. In the embodiment shown in FIG. 9, the line current and line voltage for powering the LED load 150 is provided 902 by the AC line input 104 shown in FIG. 1. The start-up circuit 122 is enabled 904 by the AC line input 104. The unity power factor controller 126 is enabled or powered on 906, which initiates switching in the switching converter 116, thereby generating power in the secondary winding, terminals 9&10 in FIG. 6, of the power transformer T1 to generate VCC within the converter 116. Once the VCC generated within the switching converter 116 reaches a predetermined level the disabling circuit 124 disables 908 the starting circuit 122.

A determination 910 is made as to whether the dimmable LED lamp 100 is electrically coupled or connected to a dimmer, such as the dimmer 106 illustrated with respect to FIG. 1. If it is determined 910 that a dimmer 106 is connected to the dimmable LED lamp 100, the current controller 112 of FIG. 1 is activated 912 each time the AC line input 104 reaches the triac firing voltage, also sometimes referred to as a "firing angle" in reference to the angle at which the sinusoid of the AC input reaches the firing voltage. The converter 116 shown in FIG. 6 varies the current level 914 applied to the LED load 150 smoothly as a function of the input DC voltage, which is the full wave rectified AC voltage produced by the dimmers 106.

If it is determined 910 that the dimmable LED lamp 100 is not connected to a dimmer 106, or when the dimmer 106 is set to full brightness, meaning that the dimmable LED lamp 100 is receiving power directly from the AC line input 104 shown in FIG. 1, current controller 112 of FIG. 1 is not activated 916. The unity power factor controller 126 maintains 918 the power factor of the dimmable LED lamp 100 at approximately 0.99 (substantially unity power factor), and the total harmonic distortion of the current waveform is maintained at less than approximately 20%. The current applied to the LED load 150 is regulated 920 at a nominal reference value.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit and scope of the invention. Moreover, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A driver for an LED lamp assembly comprising:
 a rectifier configured to receive an AC power and produce a first DC power;
 a dimmer coupled between the AC power and the rectifier, the dimmer configured to receive a first AC power and provide a second AC power to the rectifier such that an average voltage of the second AC power is less than or equal to an average voltage of the first AC power;
 a switching regulator coupled to the rectifier, the switching regulator configured to receive the first DC power and produce an output DC power; and
 an inrush current controller coupled between the rectifier and the switching regulator, the inrush current controller configured to damp and stabilize an electric current flowing between the switching regulator and the rectifier.

2. The driver of claim 1, wherein the switching regulator comprises:
 an output transformer, the output transformer having a primary side and a secondary side, wherein the primary side is coupled to the first DC power, and the secondary side is coupled to the output DC power such that the first DC power is electrically isolated from the output DC power;
 a power factor controller configured to maintain an electric current drawn from the first DC power substantially in phase with a voltage of the first DC power; and
 a power regulator, the power regulator configured to maintain the output DC power at a generally constant level based at least in part on a current flowing through the primary side.

3. The driver of claim 2, wherein the power regulator is further configured to vary the output DC power proportionately to the voltage of the first DC power when the voltage of the first DC power is below a predetermined level.

4. The driver of claim 1, comprising a filter circuit coupled between the current controller and the switching regulator, the filter circuit configured to remove noise and high frequency components from the first DC power.

5. The driver of claim 1, comprising a surge protector coupled between the rectifier and the AC power, the surge protector configured to limit a voltage of the AC power to a predetermined maximum value.

6. The driver of claim 2, comprising a starting circuit coupled to the switching regulator wherein the starting circuit is configured as a conflict monitor.

7. The driver of claim 1, wherein the switching regulator further comprises an over voltage protection circuit configured to prevent a voltage of the output DC power from exceeding a predetermined maximum value.

8. A dimmable LED light source, the light source comprising:
- a rectifier configured to receive an AC power and produce a first DC power;
- a switching regulator coupled to the rectifier, the switching regulator configured to receive the first DC power and produce an output DC power; and
- an LED lamp coupled to the output DC power,
- wherein the switching regulator comprises:
  - an output transformer, the output transformer comprising a primary side and a secondary side, wherein the primary side is coupled to the first DC power, and the secondary side is coupled to the output DC power such that the first DC power is electrically isolated from the output DC power;
  - a power factor controller configured to maintain an electric current drawn from the first DC power substantially in phase with a voltage of the first DC power; and
  - a power regulator, the power regulator configured to maintain the output DC power at a generally constant value based at least in part on a current flowing in the primary side;
- wherein the dimmable LED light source further comprises an inrush current controller coupled between the rectifier and the switching converter and configured to present a variable impedance to a rectifier current flowing from the switching converter to the rectifier when an amount of the rectifier current exceeds a predetermined value, and to present a generally constant impedance to the rectifier current when the amount of the rectifier current does not exceed the predetermined value, the constant impedance is less than the variable impedance.

9. The dimmable LED light source of claim 8 comprising a filter circuit coupled between the current controller and the switching converter, the filter circuit configured to limit the rate of change of the voltage of the first DC power.

10. The dimmable LED light source of claim 8, comprising a dimmer coupled between the AC power and the rectifier, the dimmer configured to receive a first AC power and provide a second AC power to the rectifier such that an average voltage of the second AC power is less than or equal to an average voltage of the first AC power.

11. The dimmable LED light source of claim 8, wherein the power regulator is further configured to regulate the output power at a generally constant value when an average of the voltage of the first DC power exceeds a predetermined value.

12. The dimmable LED light source of claim 8, comprising a surge protector coupled between the AC power and the rectifier, the surge protector configured to limit a voltage of the AC power to a predetermined maximum value.

13. The dimmable LED light source of claim 8, comprising a starting circuit coupled to the switching regulator wherein the starting circuit is configured as a conflict monitor.

14. The dimmable LED light source of claim 8, wherein the switching regulator further comprises an over voltage protection circuit configured to prevent a voltage of the output DC power from exceeding a predetermined maximum value.

15. The dimmable LED light source of claim 8, wherein the LED lamp comprises one or more light emitting diodes.

16. A method for driving a dimmable LED lamp assembly, wherein the LED lamp assembly includes at least one LED lamp, a switching power supply, a current control circuit, and a rectifier, the method comprising:
- receiving an AC power into the rectifier;
- converting the AC power to a DC power with the rectifier and switching power supply;
- providing the DC power to the LED lamp; and
- determining if the AC power is supplied by a dimmer; and
- if a dimmer is supplying the AC power:
  - damp and stabilize a current drawn from the AC power with the current control circuit; and
  - vary the DC power as a function of a voltage of the AC power, and
- if a dimmer is not supplying the AC power:
  - regulate a power factor of the lamp assembly between about 0.99 and 1.0;
  - maintain a total harmonic distortion of the AC power less than about 20%;
  - regulate a LED lamp current at a predetermined value;
- wherein converting the AC power to a DC power further comprises:
  - enabling a starting circuit with the AC power;
  - starting the switching power supply with the starting circuit; and
  - disabling the starting circuit once the power supply is started.

17. A driver for an LED lamp assembly comprising:
- a rectifier configured to receive an AC power and produce a first DC power;
- a switching regulator coupled to the rectifier, the switching regulator configured to receive the first DC power and produce an output DC power; and
- a current controller coupled between the rectifier and the switching regulator, the current controller configured to damp and stabilize an electric current flowing between the switching regulator and the rectifier;
- wherein the switching regulator comprises:
  - an output transformer, the output transformer having a primary side and a secondary side, wherein the primary side is coupled to the first DC power, and the secondary side is coupled to the output DC power such that the first DC power is electrically isolated from the output DC power;
  - a power factor controller configured to maintain an electric current drawn from the first DC power substantially in phase with a voltage of the first DC power; and
  - a power regulator, the power regulator configured to maintain the output DC power at a generally constant level based at least in part on a current flowing through the primary side;
- wherein the driver further comprises a starting circuit coupled to the switching regulator wherein the starting circuit is configured as a conflict monitor.

* * * * *